3,586,475
SOLVENT DYEING OF KERATINOUS MATERIALS WITH DISPERSE DYES OR AZO PREMETALLIZED DYES
Gordon Trent Hewitt, Upper Montclair, N.J., assignor to Colgate-Palmolive Company, New York, N.Y.
No Drawing. Filed Nov. 18, 1966, Ser. No. 595,373
Int. Cl. A61k 8/12
U.S. Cl. 8—10.1                                    10 Claims

ABSTRACT OF THE DISCLOSURE

Keratinous materials such as hair can be dyed with disperse dyes or azo premetallized dyes in an alcoholic-aqueous medium with a solvent assist adjuvant such as lower alkyl N,N-dimethyl amides and alkyl N,N-N',N'-tetramethyl amides.

This invention relates to the coloring of keratinous materials. More particularly, this invention relates to the dyeing of hair.

In recent years advances have been made regarding the science of coloring hair with semi-permanent hair dye compositions. A semi-permanent dye is a dye of the temporary type, but with longer lasting characteristics, in effect, a hair coloring which will withstand many shampoo treatments due to the system used to exhaust the dye onto the hair.

Broadly, the invention relates to a system for exhausting either disperse dyes or azo premetallized dyes onto keratinous materials employing relatively short exposure times, reasonable pH values and room temperature conditions. The system includes an alcoholic-aqueous medium with a solvent assist adjuvant selected from the group consisting of lower alkyl N,N-dimethyl amides and alkyl N,N-N',N'-tetramethyl amides and mixtures thereof.

The azo premetallized dyes present superior fastness properties when applied to such polyamide fibers as hair, wool, silk and nylon. Their solubility properties and anionic nature require special techniques such as highly acidic dye bath and excessive temperature or prolonged time exposure in order to achieve any depth of color or dyeing efficiency on such fibers.

Disperse dyes are defined as a class of water-insoluble dyes, originally provided for dyeing cellulose acetate, and applied as a rule from fine aqueous suspensions. They have been used to a limited degree on wool sheepskins and furs for the production of level pastel shades. Also, attempts have been made to apply these dyes to human hair.

Disperse dyes include nitro-arylamines, azo dyes, and anthraquinone dyes and are all characterized by the absence of solubilizing sulfonic acid groups. Specific examples of preferred disperse dyes are C.I. Disperse Violet 4 (C.I. 61105) and C.I. Disperse Orange 5 (C.I. 11100), the designations being those mentioned in Colour Index, 4 vols., American Association of Textile Chemists and Colourists, Lowell, Mass. The disperse dyes enumerated are merely examples of suitable dyes of this type and the other disperse dyes enumerated in the aforementioned Colour Index can be used. It will be appreciated that disperse dyes are well described in the textile literature. Additional applicable disperse dyes can be found in the 1961 Technical Manual of the American Association of Textile Chemists and Colourists, vol. 38, pages 292–293; in the Chemistry of Synthetic Dyes and Pigments (1955) by H. A. Lubs, pages 167–174 and 417–426; and in K. Vankataraman, The Chemistry of Synthetic Dyes (1952) vol. I, pages 639–646 and vol. II, pages 803–812.

The azo metallized dyes comprise particularly chromium and cobalt complexes of azo dyes with appropriate chelating groups, the ratio of metal:azo dye being 1:2. They are further characterized by the absence of solubilizing sulfonic acid groups. Such dyes are sold under a variety of trade names, such as Cibalans, Irgalans, Irgacets, Capacyls, Lanasyns, Supralans and others. Irgalans have been described in an article by G. Schetty, J. Soc. Dyers and Colourists 71, 705 (1955). As an example there can be mentioned Irgalan Orange RL which is the sodium-ammonium salt of the chromium complex of the azo dye obtained from diazotized 3-amino-4-hydroxyphenyl-methyl-sulfone coupled in 3'-chloro-1-phenyl-3-methyl-pyrazolone-5 (Example 8 of U.S. Pat. No. 2,551,056). Irgalan Gray BL described in Example 13 of the same patent uses the same di-azo component but the coupling component is the methylurethane of 1-amino-7-hydroxynaphthalene.

Cibalans are dealt with in an article by C. Weidmann, Am. Dyestuffs Reporter 43, 167 (1954). As an example may be mentioned Cibalan Orange RL which is a chromium complex of 2-aminophenol-4-sulfonamide coupled on 1-p-tolyl-3-methylpyrazolone-5.

The dyeing process of this invention can be employed over a wide pH range such as that of about 2.5 to 9.0, preferably a pH of 3.5 to 7, the actual pH depending on the class of dye employed. In the case of the neutral premetallized dyes, where the acid form of these dyes is less water-soluble than the salt form, an acid pH in the range of about 3–6 is preferred. The pH can be adjusted to the preferred value by the addition to the dyeing composition of various inorganic or organic acids or acid-salts as for example hydrochloric acid, sulfuric acid, ammonium sulfate, acetic acid, formic acid, citric acid, lactic acid or tartaric acid.

Illustrative of the lower alkyl N,N-dimethyl amides are hexanoic N,N-dimethyl amide and pelargonic N,N-dimethyl amide. Illustrative of the alkyl N,N-N',N'-tetramethyl amides applicable to the present invention are those of such dibasic acids as azelaic, sebacic, brassylic, or dimerized linoleic acid. In other words, greatest effectiveness is achieved when the alkyl hydrophobe comprises 5 to 6 carbon atoms per —N(CH$_3$)$_2$ group.

The dyeing compositions of the present invention contain a dye of low water solubility which has some solubility in the aqueous-alcohol system. Alcohols applicable are methanol, ethanol and isopropanol.

Additionally, the compositions can contain conventional dye additives such as thickeners, detergents, brighteners etc.

The quantity of the various ingredients in the dyeing composition can vary over a wide range. Illustratively, the quantity of the said amide can preferably vary from about 2% to about 5% and particularly from about 3 to about 5% by weight of the dyeing composition. The dye can vary over a wide range such as that from about a small but perceptible amount to 5% and preferably from about .05% to about 0.5% by weight of the composition. The compositions are aqueous since they contain some water. The quantity of water can vary over a wide range such as that from about 30%–99% and particularly from 70% to 90% based on the weight of the composition.

The dyeing compositions of this invention can be formulated in conventional forms such as solutions, gels, pastes, emulsions, dispersions, and the like, and can be prepared by the conventional methods used in the dyeing art. For instance, it has been found advantageous to thicken the dyeing composition with a synthetic gum such as Methocel (using 0.5% to 1.0% gum).

The dyeing compositions can be applied to polyamide fibers by the conventional techniques known in the art.

Illustratively when applied to living hair on the human head, which may have been previously bleached; the dyeing compositions of the present invention can be applied to the hair with a brush, sponge, or other means of contact until the hair is properly dyed. The reaction time or time of contact of the dyeing composition is fairly short, namely of the order to 5 to 15 minutes. The temperature of the composition is from 50° F. to 100° F., preferably at ambient room temperature.

It has also been discovered that the use of the said amides as solvent assistants gives exceptionally high efficiency of exhaustion of azo-metallized dyes onto wool, silk and nylon under the conditions used in textile plants, i.e., higher temperatures, of the order of 120° F. to 160° F. After the dye has been exhausted from the bath onto the fabric the dye bath can be regenerated by adding just dye and acid; and only occasionally replenishing the not very volatile amide.

EXAMPLE I

| | Percent by weight |
|---|---|
| Hexanoic N,N-dimethyl amide | 3.0 |
| Citric acid | 0.5 |
| Ethanol (95%) | 15.0 |
| Dye [1] | 0.2 |
| Deionized water | 81.3 |
| | 100.0 |

[1] 2:1 chromium-mixed complex of the monoazo dyestuffs of the formulas

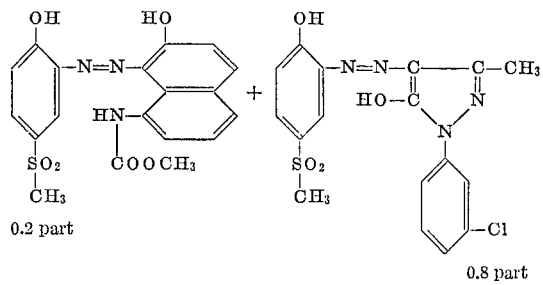

0.2 part 0.8 part

The above formulation was particularly effective at dyeing both combed wool and bleached human brown hair. The exposure time was 10 minutes with temperature conditions of 73° F.

EXAMPLE II

| | Percent by weight |
|---|---|
| Pelargonic N,N-dimethyl amide | 2.0 |
| Tartaric acid | 0.7 |
| Ethanol | 30.0 |
| Irgalan Orange RL | 0.5 |
| Water | 66.8 |
| | 100.0 |

EXAMPLE III

| | Percent by weight |
|---|---|
| Azelaic N,N-N',N'-tetramethyl amide | 5.0 |
| Acetic acid | 0.4 |
| Methanol | 10.0 |
| Irgalan Gray BL | 0.1 |
| Water | 84.5 |
| | 100.0 |

EXAMPLE IV

| | Percent by weight |
|---|---|
| Hexanoic N, N-dimethyl amide | 3.0 |
| Acetic acid | 0.6 |
| Ethanol | 25.0 |
| C.I. Disperse Violet 4 | 5.0 |
| Water | 66.4 |
| | 100.0 |

It will be apparent that many changes and modifications of the several features described herein may be made without departing from the spirit and scope of the invention. It is therefore apparent that the foregoing description is by way of illustration of the invention rather than limitation of the invention.

What is claimed is:

1. A dyeing composition comprising an alcoholic aqueous medium, said medium containing 10% to 30% by weight of a $C_1$–$C_3$ alkanol; a small dyeing amount up to 5% by weight of a dye selected from the group consisting of disperse dyes and azo metallized dyes, 2% to 5% by weight of an additive selected from the group consisting of N,N-dimethyl amides of $C_5$–$C_9$ alkyl monocarboxylic acids, N,N-N',N'-tetramethyl amides of $C_9$–$C_{13}$ alkyl dicarboxylic acids, N,N-N',N'-tetramethyl amide of dimerized linoleic acid, and mixtures thereof.

2. The composition of claim 1 wherein the quantity of dye is between .05% to 0.5% by weight, the quantity of said amides is between 3% to 5% by weight, and the balance is water.

3. The composition of claim 1 wherein the alkyl group of N,N-dimethyl amides has 5 to 6 carbon atoms.

4. The composition of claim 1 wherein the alkyl group of N,N-N',N'-tetramethyl amides has 10 to 12 carbon atoms.

5. The composition of claim 3 wherein the pH is between 3.5 to 7.

6. The composition of claim 4 wherein the pH is between 3.5 to 7.

7. The method of dyeing keratinous material comprising applying thereto an effective amount of an alcoholic aqueous composition containing 10% to 30% by weight of a $C_1$–$C_3$ alkanol; a small dyeing amount up to 5% by weight of a dye selected from the group consisting of disperse dyes and azo metallized dyes, and 2% to 5% by weight of an additive selected from the group consisting of N,N-dimethyl amides of $C_5$–$C_9$ alkyl monocarboxylic acids, N,N-N',N'-tetramethyl amide of $C_9$–$C_{13}$ alkyl dicarboxylic acids, N,N-N',N'-tetramethylamide of dimerized linoleic acid, and mixtures thereof.

8. The method of claim 7 wherein the pH of the composition is between 3.5 and 7.

9. The method of claim 8 wherein the application period is between 5 to 15 minutes.

10. The method of claim 9 wherein the temperature of the composition is between 50° F. and 100° F.

References Cited

UNITED STATES PATENTS

| 2,163,043 | 6/1939 | Kritchevsky | 8—10.1 |
| 2,225,604 | 12/1940 | Lubs et al. | 8—85 |
| 3,098,013 | 7/1963 | Austin et al. | 8—10.1 |
| 3,206,363 | 9/1965 | Lecher et al. | 8—10.1 |
| 3,261,754 | 7/1966 | Peters et al. | 8—10.1 |

ALBERT T. MEYERS, Primary Examiner
V. C. CLARKE, Assistant Examiner

U.S. Cl. X.R.

8—10, 42, 43, 85, 87, 172